ically unsaturated organic compound such as 3-pentene-nitrile or 4-pentenenitrile in the presence of a zerovalent nickel compound of the type $Ni(PXYZ)_4$, $Ni(PXYZ)_3R^2CN$ or $Ni(PXYZ)_2A$ wherein X is OR and Y and Z are R or OR and R is an alkyl or aryl group of up to 18 carbon atoms, $R^2$ is 2-butenyl, 3-butenyl or cyano-substituted alkyl radical and A is 3-pentenenitrile or 4-pentenenitrile, the radicals of a given PXYZ ligand in $Ni(PXYZ)_3R^2CN$ or $Ni(PXYZ)_2A$ being so chosen that the ligand has a cone angle of 130° to 170° wherein the zerovalent nickel compound is contacted with an activated crystalline zeolite molecular sieve having substantially uniform pore diameters in the range of about 3Å to about 13Å.

United States Patent
Mok

[11] 3,846,474
[45] Nov. 5, 1974

[54] PROCESS FOR HYDROCYANATION OF OLEFINIC COMPOUNDS

[75] Inventor: Young I. Mok, Wilmington, Del.

[73] Assignee: E. I. duPont de Nemours and Company, Wilmington, Del.

[22] Filed: Oct. 2, 1973

[21] Appl. No.: 402,904

[52] U.S. Cl. .......................................... 260/465.8 R
[51] Int. Cl. .......................................... C07c 121/04
[58] Field of Search ........ 260/465.8 R, 465.9, 465.3

[56] References Cited
UNITED STATES PATENTS

| | | | |
|---|---|---|---|
| 3,496,215 | 2/1970 | Drinkard et al. | 260/465.8 R |
| 3,496,217 | 2/1970 | Drinkard et al. | 260/465.9 X |
| 3,496,218 | 2/1970 | Drinkard, Jr. et al. | 260/465.9 X |
| 3,526,654 | 9/1970 | Hildebrand | 260/465.9 |
| 3,631,191 | 12/1971 | Kane et al. | 260/465.3 |
| 3,652,641 | 3/1972 | Druliner | 260/465.3 |
| 3,766,231 | 10/1973 | Gosser et al. | 260/465.8 R |
| 3,773,809 | 11/1973 | Walter | 260/465.8 R |

Primary Examiner—Joseph P. Brust

[57] ABSTRACT

An improved process for the hydrocyanation of an olefinically unsaturated organic compound such as 3-pentene-nitrile or 4-pentenenitrile in the presence of a zerovalent nickel compound of the type $Ni(PXYZ)_4$, $Ni(PXYZ)_3R^2CN$ or $Ni(PXYZ)_2A$ wherein X is OR and Y and Z are R or OR and R is an alkyl or aryl group of up to 18 carbon atoms, $R^2$ is 2-butenyl, 3-butenyl or cyano-substituted alkyl radical and A is 3-pentenenitrile or 4-pentenenitrile, the radicals of a given PXYZ ligand in $Ni(PXYZ)_3R^2CN$ or $Ni(PXYZ)_2A$ being so chosen that the ligand has a cone angle of 130° to 170° wherein the zerovalent nickel compound is contacted with an activated crystalline zeolite molecular sieve having substantially uniform pore diameters in the range of about 3Å to about 13Å.

18 Claims, No Drawings

PROCESS FOR HYDROCYANATION OF OLEFINIC COMPOUNDS

BACKGROUND OF THE INVENTION

The hydrocyanation of olefinically unsaturated organic compounds such as 3-pentenenitrile or 4-pentenenitrile using certain zerovalent nickel compounds is described in U.S. Pat. Nos. 3,496,215, 3,496,217, 3,496,218 and in Belgian Pat. No. 787,043. In commercial production, optimization of catalyst utility as well as product distribution especially as to production of adiponitrile is highly desired. Accordingly, further improvement of hydrocyanation reactions in these respects has been sought.

SUMMARY OF THE INVENTION

It has been found that improved catalyst utility and product distribution can be realized in hydrocyanation of organic compounds such as 3-pentenenitrile or 4-pentenenitrile to the corresponding organic dinitriles by contacting the zerovalent nickel catalyst either during the hydrocyanation reaction or prior to introducing the catalyst into the reaction medium, with an activated crystalline metal alumino-silicate zeolite molecular sieve having substantially uniform pore diameters in the range of about 3A to about 13A.

Especially useful zeolite molecular sieves are those corresponding to the formulae $M_{2/n}O:Al_2O_3:xSiO_2\cdot yH_2O$ wherein M is an alkali or alkaline earth metal such as lithium, sodium, potassium, rubidium, cesium, calcium, barium or strontium, preferably sodium, potassium or calcium, $n$ denotes the valence of the metal, $x$ has a value of about 2.0 to 2.5 and $y$ has a value up to about 10. Specific molecular sieves that can be used are of the type 3A, 4A and 5A having the general formula $$1 \pm 0.2\ M_{2/n}O:Al_2O_3:1.85 \pm 0.5\ SiO_2:0 - 6H_2O$$

and type 10X and 13X having the general formula $$0.9 \pm 0.2\ M_{2/n}O:Al_2O_3:2.5 \pm 0.5\ SiO_2:0 - 8H_2O$$

wherein preferably M is sodium, potassium or calcium.

Prior to use the molecular sieves are activated by heating at a temperature in the range of 100°C. to about 350°C. and optionally under reduced pressure to remove water from the zeolite without, however, altering its internal structure. Normally about 5 to about 20 percent of the molecular sieves are used based on the weight of the catalyst solution being treated. The treatment can be carried out conveniently at ambient temperature and temperatures in the range of 0°C. to about 100°C., preferably 0°C. to 35°C., can be employed. The treatment process can be batch or continuous. Suitable zeolite molecular sieves for use in this invention can be obtained from a number of sources including, in particular, the Linde Division of Union Carbide Corporation and W. R. Grace Company. The preparation of zeolite A molecular sieves is described in U.S. Pat. No. 2,882,243; that of zeolite X molecular sieves is described in U.S. Pat. No. 2,882,244.

The zerovalent nickel compounds used as catalysts in the hydrocyanation processes of U.S. Pat Nos. 3,496,215, 3,496,217 and 3,496,218 are of the general formula Ni(PXYZ)$_4$ wherein X is OR and Y and Z are of the group consisting of R and OR and R is an alkyl or aryl group having up to 18 carbon atoms. If desired, any of the R's in a given PXYZ ligand may be cojoined. Ligands of this type include the aryl phosphites such as triphenyl phosphite, tri-(m & p-methoxy)phenyl phosphite, tri-m-tolyl phosphite, tri-p-tolyl phosphite, tri-(m & p-tolyl)phosphites as well as mixtures of the aforementioned phosphites. The hydrocyanation reactions with these catalysts are normally carried out at temperatures in the range of −25°C. to 200°C., preferably 0°C. to 150°C.

Other zerovalent nickel compounds which can be used as catalysts for hydrocyanation of 3-pentenenitrile and 4-pentenenitrile are the N-bonded nitrile complexes of the formula Ni(PXYZ)$_3$R$^2$CN and olefin-bonded complexes of the formula Ni(PXYZ)$_2$A wherein X, Y and Z are as defined above, R$^2$ is 2-butenyl, 3-butenyl or cyano-substituted alkyl radicals, A is 3-pentenenitrile or 4-pentenenitrile and the R groups in PXYZ are so chosen that the ligand has a cone angle of 130° to 170°. The cone angle is determined as described by C. A. Tolman, *J. Am. Chem. Soc.* 92, 2956 (1970). Typical phosphorus ligands of this type include tri-o-tolyl phosphite, tri-(2,5-xylyl)phosphite, tri-(2,4-xylyl)phosphite, tri-(o-phenylphenyl)phosphite, diphenyl phenyl phosphonite, di-o-tolyl phenyl phosphonite and phenyl diphenyl phosphinite. Hydrocyanation reactions with catalysts of this type are normally carried out at temperatures in the range of −50°C. to 150°C., preferably −15°C. to 75°C.

As described in the above references, a promoter may also be used with the catalyst in the hydrocyanation reaction to improve activity of the catalyst and control distribution of the products. One type of promoter comprises a cation of a metal such as that of zinc, cadmium, beryllium, aluminum, gallium, indium, silver, titanium, zirconium, hafnium, germanium, tin, vanadium, molybdenum, scandium, chromium, niobium, tungsten, manganese, rhenium, palladium, thorium, erbium, iron and cobalt or mixtures thereof.

The anion portion of the promoter compound can be of the group consisting of halide, e.g., fluoride, chloride, bromide, and iodide, anions of lower fatty acids of from 2 to 7 carbon atoms, $HPO_3^{-2}$, $H_2PO_2^{-}$, $CF_3COO^{-}$ and $OSO_2C_7F_{15}^{-}$ and $SO_4^{-2}$. Preferred anions are the halides, especially chloride, bromide and iodide. An especially preferred promoter is zinc chloride. The amount of promoter used can be generally varied from about 1:16 to 50:1 mole ratio of promoter to catalyst. The promoter may be used according to several techniques. For example, at least some of the promoter may be added to the reaction mixture at the start of the reaction and additional amounts may be added at any point in time during the reaction.

Also useful as promoters in the hydrocyanation reaction, particularly for the situation wherein the catalyst is of the species Ni(PXYZ)$_3$R$^2$CN or Ni(PXYZ)$_2$A, are organo boron compounds of the formula B(R$^3$)$_3$ and B(OR$^3$)$_3$ wherein R$^3$ is of the group consisting of aryl radicals of from 6 to 18 carbon atoms, lower alkyl radicals of from 1 to 7 carbon atoms and lower alkyl radicals of from 1 to 7 carbon atoms substituted with a cyano radical. Generally, the case where R$^3$ is phenyl or phenyl substituted with an electronegative radical is preferred.

In many instances it may be advantageous to have present during the hydrocyanation an excess of the phosphorus ligand over that required in the zerovalent nickel catalyst compounds described above. The excess ligand can also be employed in conjunction with the above-described promoters. In general, at least a 1-mole excess of the ligand can be used and amounts of 30 moles excess or more may be used, the top limit being dictated mainly by economic considerations.

As indicated above, the process of this invention can be carried out by contacting the catalyst in the reaction medium with the crystalline zeolite molecular sieve or the catalyst can be contacted before being introduced into the reaction medium, or during in situ preparation, or by withdrawing the used catalyst from the reactor and treating it with the molecular sieve and thereafter recycling the catalyst in the reactor. Optionally the promoters described above and/or excess phosphorus ligand may also be present with the catalyst during its being contacted with the molecular sieves.

In general, the hydrocyanation reaction may be carried out by charging a reactor with all of the reactants or preferably the reactor is charged with the catalyst or catalyst components, the unsaturated organic compound, promoter and whatever solvent is to be used and thereafter hydrogen cyanide is swept over the surface of the reaction mixture or bubbled through the mixture. The mole ratio of unsaturated compound to catalyst generally is in the range of 1:5 to 2,000:1.

Preferably, the reaction medium is agitated such as by stirring or shaking. Hydrocyanation products can be recovered by convenient techniques such as by distillation. The reaction can be run either batchwise, semi-batchwise or in a continuous manner and can be carried out either with or without a solvent. If used, the solvent should be liquid at the reaction temperature and pressure and inert toward the unsaturated compound and the catalyst. Generally, such solvents are hydrocarbons such as benzene or xylene or nitriles such as acetonitrile or benzonitrile. In many cases, the excess ligand may serve as the solvent.

Atmospheric pressure is satisfactory for carrying out the process of the present invention. Pressures of from about 0.05 to 10 atmospheres are preferred due to the obvious economic consideration although pressures such as 0.05 to 100 atmospheres can be used if desired.

The nitriles obtainable by the process of this invention are useful as chemical intermediates. For instance, adiponitrile can be converted to hexamethylenediamine, an intermediate used in the manufacture of important polyamides. Other nitriles can be used to produce the corresponding acids and amines which are conventional commercial products. As noted above, advantages of improved catalyst utility as well as improved product distribution are realized by the process of this invention.

DESCRIPTION OF PREFERRED EMBODIMENTS

The process of this invention is further illustrated in the examples to follow. The following abbreviations are used.

3PN - 3-pentenenitrile
TTP - mixture of m and p-tritolyl phosphites
o-TTP - tri-(p-tolyl) phosphite
ADN - adiponitrile
MGN - methylglutaronitrile
ESN - ethylsuccinonitrile
HCN - hydrogen cyanide
Ni(O) - zerovalent nickel
$BO_3$ - triphenyl borane Prior to their being used in the experiments described below the crystalline zeolite molecular sieves were activated by heating in a vacuum oven overnight at 350°C. with nitrogen sparge.

I - Molecular Sieve Treatment of Catalyst in Hydrocyanation Medium

In the following experiments the molecular sieve was introduced along with the other reactants in the hydrocyanation medium. Analysis of the products was carried out by gas chromatography.

The zerovalent nickel compound was determined by gel permeation chromatography. The zerovalent nickel complexes have a much higher molecular weight and size than any of the other components in the reaction medium. This fact forms the basis for the separation of the complexes from low molecular weight species by gel permeation chromatography.

The preparation of the zerovalent nickel catalyst complexes and the hydrocyanation reactions were carried out under a suitable inert atmosphere such as nitrogen or with nitrogen purge.

EXAMPLE 1

A. Control Run

A charge for hydrocyanation having the composition: 74.4% 3PN (918.3 mmoles), 0.44% Ni(O), 1.4% $ZnCl_2$ and 22.81% TTP was prepared by reduction of $NiCl_2$ with zinc dust in a mixture of 3PN and TTP at about 80°C. 55 Grams of the above mixture was charged to a reactor simultaneously with 16 ml. (412.6 mmoles) of HCN. The reactor temperature was maintained at 0°C. for 84 hours. Analysis of the product by gas chromatography gave the following:

```
                7.08% ADN
                1.11% MGN
0.19% ESN      ─────────
                8.38%
```

Analysis by gel permation chromatography showed there was no active nickel in the reaction mixture at the end of the run.

B. Test Run

The conditions and reagents were identical to those of A above except that an amount of 4.5 g. of Linde Type 4A molecular sieve was added with the reagents. At the end of the run analyses of the product were as follows:

```
                20.23% ADN
                 3.21% MGN
0.44% ESN      ─────────
                23.88%
```

Analysis by gel permeation chromatography showed that 47 percent of the active zerovalent nickel charged in the reactor initially survived the reaction.

EXAMPLES 2, 3 and 4

These examples were carried out following the procedure of Example 1 except that the reactor temperature was held at 25°C. The results are shown in tabular form below.

| Ex. | Composition of Charge Mixture, Molar Ratio HCN/3PN/Ni(O)/ZnCl$_2$/TTP | Molecular Sieves Charged* | Resultant Distribution to ADN** |
|---|---|---|---|
| 2 | 600/350/1/2/4.93 | 1.6% Type 4A | 88.2% |
| 3 | 600/350/1/2/4.93 | 3.2% Type 4A | 87.9% |
| 4 | 600/350/1/2/4.93 | 3.2% Type 13X*** | 89.9% |

*Based on weight of solution
**ADN /ADN and other conversion products
***Nominal pore diameter – 10A

EXAMPLE 5

A. Control Run

A charge of 0.98 g. (0.67 mmole) of Ni[P(O-p-C$_6$H$_4$CH$_3$)$_3$]$_4$, 0.19 g. (1.33 mmoles) of ZnCl$_2$ and 20 ml. (205 mmoles) of 3PN were placed in a reactor. With temperature maintained at approximately 25°C., HCN was introduced at a rate of 19.8 mmoles per hour over a period of 16 hours. Resultant distribution to ADN was 80 percent; catalyst utility was four cycles (moles product/mole of catalyst charged).

B. Test Run

The experiment of A was repeated but with addition of 1.78 g. (10 percent of weight of catalyst solution) of Linde 3A molecular sieve to the reaction mixture. Distribution to ADN was 82.2 percent; catalyst utility was 23 cycles.

EXAMPLE 6

A. Control Run

A charge of 1.96 g. (1.34 mmoles) of Ni[P(O-p-C$_6$H$_4$CH$_3$)$_3$]$_4$, 0.38 g. (2.67 mmoles) of ZnCl$_2$, 40 ml. (410 mmoles) of 3PN and 2.35 g. (6.68 mmoles) of tri-p-tolyl phosphite was placed in a reactor. With temperature at approximately 25°C., HCN was fed at a rate of 119.5 mmoles per hour for about 4½ hours. Conversion to hydrocyanated products was 15 percent, distribution to ADN was 79.75 percent; catalyst utility was 45 cycles.

B. Test Run

The experiment of A was repeated but with addition of 3.8 g. of Linde 4A molecular sieve to the reaction mixture. Conversion to hydrocyanated products was 54 percent, distribution to ADN was 81.41 percent; catalyst utility was 165 cycles.

II - Treatment of Zerovalent Nickel Catalyst with Molecular Sieve Prior to Introduction in Reaction Medium Catalyst solution for Examples 7, 8 and 9 was prepared as follows. An amount of 140 g. of ZnCl$_2$ (97.3 percent assay) and 822.5 g. of distilled 3PN was placed in a reaction flask and approximately one mole of water was removed by azeotropic distillation at 80°–90°C. at 160 Torr. An amount of 118.8 g. of NiCl$_2$6H$_2$O was introduced following which a further amount of 51 ml. of water was removed by azeotropic distillation. To 960.9 g. of the resulting blue cloudy solution there was added 936.3 g. of tri-o-tolyl phosphite and 36 g. of finely divided zinc while the temperature of the mixture was held at about 60°C. with stirring. After about 6 hours the reaction mixture was cooled to 41°C. and purged with anhydrous ammonia to precipitate ZnCl$_2$ from the mixture, which was thereafter removed by filtration.

EXAMPLE 7

A. Control Run

Into a reactor was charged 50 ml. of 3PN, 4.34 ml. of catalyst solution prepared as described above and corresponding to 0.5 millimole of zerovalent nickel, 7.19 ml. of tri-o-tolyl phosphite and 2.0 ml. of 0.25 molar solution of triphenyl borane solution in 3-pentenenitrile. An equimolar mixture of HCN and 3PN was fed into the reactor while the mixture was vigorously stirred with the temperature maintained at 15°C. Reactivity was monitored by an exotherm shown on an AZAR Recorder (Leeds and Northrup Speedomax H) and the run was terminated with the reaction stopped (about 5¼ hours). Catalyst utility obtained in this run was 194.5 cycles.

B. Control Run

Following the procedure and conditions of Control Run A, there was charged to the reactor 58.9 ml. of catalyst solution in 3-pentenenitrile corresponding to 0.5 millimoles of Ni(O) catalyst, together with 0.47 ml. BO solution in 3-pentenenitrile corresponding to 0.5 millimole of BO$_3$. The resulting catalyst utility was 130 cycles.

C. Test Run

In this run the catalyst solution, prior to introduction into the reactor, was passed through a 100 ml. Type 13X molecular sieve bed contained in a graduated burette at a feed rate of 1.91 ml/minute at room temperature. The catalyst solution so treated was introduced into the reactor and hydrocyanation carried out as described in Control Run A. A catalyst utility of 319 cycles was obtained.

D. Test Run

The procedure of Test Run C was repeated but with the added feature that an amount of 10 percent by weight of Type 13X molecular sieve was added to the reactor. A catalyst utility of 445 cycles was obtained.

EXAMPLE 8

A quantity of catalyst solution in 3PN (58.94 ml.) corresponding to 0.5 millimoles of Ni(O) was passed through a Type 13X molecular sieve bed (1.5 inches × 6 foot — ⅛ inch pellets), then charged to a reactor together with 0.47 ml. of BO$_3$ (0.5 mmole BO$_3$) in 3PN. Following the procedure of Control Run A a catalyst utility of 423 cycles was obtained.

EXAMPLE 9

A charge of 100 g. of catalyst solution, 273.74 ml. of tri-o-tolyl phosphite and 36.8 ml. of 3PN was placed in a vessel to which 20 g. of Linde Molecular Sieve Type 4A was added. The vessel was left at room temperature for three hours with occasional shaking by hand; the catalyst solution was then filtered through a fritted disc filter.

A hydrocyanation reaction was carried out by charging 3.68 ml. of the treated catalyst solution, 7.37 ml. of tri-o-tolyl phosphite, 46.68 ml. of 3PN and 1.0 ml. of BO$_3$ (1.0 mmole BO$_3$) in 3PN to a reactor, following which a feed of 15 millimoles per hour of HCN premixed with 3PN in 1/1 mole ratio while maintaining the temperature of the reactor at 15°C. A catalyst utility of 344 cycles was obtained, as compared with a catalyst utility of 154 cycles when nontreated catalyst solution was used.

III. Use of Zeolite Molecular Sieves for Reactivating Recovered or Recycled Zerovalent Nickel Hydrocyanation Catalysts The examples to follow were carried out in general as described in Section II above. Progress of the hydrocyanation was monitored by means of an exotherm displayed on an AZAR Recorder. The run was terminated when the exotherm dropped to one-half of the steady state value and catalyst utility was computed on the basis of the amount of HCN fed to the reactor.

EXAMPLE 10 (Control — No zeolite treatment)

A charge of 14.27 ml. of catalyst solution prepared as described under II, recovered from hydrocyanation reactions as described in Example 7-9 and corresponding to 0.5 millimole of Ni(O), 48.70 ml. of 3PN and 1.0 ml. of $BO_3$ solution in 3PN (1.0 mmole $BO_3$) was reacted with a feed of 15 millimoles of HCN per hour (equimolar mixture with 3PN) at 15°C. A catalyst utility of 169 cycles was realized in one run and 100 cycles in another.

EXAMPLE 11 - (Zeolite treated)

Three hundred grams of recovered catalyst solution in 3PN (same as used in Example 10) were treated with stirring in a nitrogen sparged vessel with 30 g. of Type 4A zeolite molecular sieve for 3 hours and 56 minutes at room temperature, then used in the following experiment.

A charge of 30.42 ml. of the so-treated catalyst solution, 31.81 ml. of 3PN and 0.47 ml. of $BO_3$ in 3PN (0.5 mmole $BO_3$) was reacted with HCN as described in Example 10. A catalyst utility of 181 cycles was obtained.

In repeat experiments carried out as described above but wherein the zeolite treatment was for a longer time (about 5 hours), catalyst utilities of 330 cycles and 363 cycles were realized.

I claim:

1. In a process of hydrocyanating an olefinically unsaturated organic compound of the group consisting of 3-pentenenitrile and 4-pentenenitrile under a pressure of about 0.05 to 100 atmospheres in the presence of a catalyst consisting essentially of a zerovalent nickel complex of the group consisting of $Ni(PXYZ)_4$, N-bonded nitrile complexes of the formula $Ni(PXYZ)_3R^2CN$ and olefin-bonded complexes of the formula $Ni(PXYZ)_2A$ wherein X is OR, Y and Z are R or OR and R is of the group consisting of aryl radicals and alkyl hydrocarbyl radicals of up to 18 carbon atoms, $R^2$ is of the group consisting of 2-butenyl, 3-butenyl and cyano-substituted alkyl radicals, and A is of the group consisting of 3-pentenenitrile and 4-pentenenitrile, wherein the R radicals of a given PXYZ ligand of $Ni(PXYZ)_3R^2CN$ and $Ni(PXYZ)_2A$ are so chosen that the ligand has a cone angle of 130° to 170°, the mole ratio of the mononitrile to the nickel complex being in the range of about 1:5 to 2000:1;

the improvement which comprises contacting the catalyst at a temperature in the range of 0°C. to 100°C. with an activated crystalline metal aluminosilicate zeolite molecular sieve having substantially uniform pore diameters in the range of about 3Å to about 13Å, the amount of molecular sieve used being about 5 percent to about 20 percent by weight based on weight of the catalyst solution.

2. The process of claim 1 wherein the crystalline zeolite molecular sieve corresponds to the formula $$M_{2/n}O:Al_2O_3:xSiO_2:yH_2O$$

wherein M is a metal of the group consisting of alkali and alkaline earth metals, $n$ denotes the valence of the metal, $x$ has a value of about 2 to 2.5 and $y$ has a value up to about 10.

3. The process of claim 2 wherein M is of the group consisting of sodium, potassium and calcium.

4. The process of claim 3 wherein the catalyst is contacted at a temperature in the range of 0°C. to 35°C.

5. The process of claim 4 wherein the zerovalent nickel complex is contacted with the zeolite molecular sieve in the hydrocyanation medium.

6. The process of claim 4 wherein the zerovalent nickel complex is contacted with the zeolite molecular sieve prior to being introduced into the hydrocyanation medium.

7. The process of claim 4 wherein the zerovalent nickel complex is withdrawn from the reaction medium and prior to its being returned to the hydrocyanation medium it is contacted with the zeolite molecular sieve.

8. The process of claim 5 wherein the catalyst consists essentially of a zerovalent nickel complex of the formula $Ni(PXYZ)_4$ wherein X is OR, Y and Z are R or OR and R is an alkyl or aryl radical having up to 18 carbon atoms.

9. The process of claim 8 wherein there is present also a promoter selected from the group consisting of (a) a cation of a metal of the group consisting of zinc, cadmium, beryllium, aluminum, gallium, indium, silver, titanium, zirconium, hafnium, germanium, tin, vanadium, molybdenum, scandium, chromium, niobium, tungsten, manganese, rhenium, palladium, thorium, erbium, iron and cobalt or mixtures thereof, the cation being associated with an anion of the group consisting of halides, anions of lower fatty acids of from 2 to 7 carbon atoms, $HPO_3^{-2}$, $H_2PO_2^-$, $CF_3COO^-$, $OSO_2C_7H_{15}^-$ and $SO_4^{-2}$, or (b) an organoboron compound of the group consisting of $B(R^3)$ and $B(OR^3)$ wherein $R^3$ is of the group consisting of aryl radicals of from 6 to 18 carbon atoms, lower alkyl radicals of from 1 to 7 carbon atoms and lower alkyl radicals of 1 to 7 carbon atoms substituted with a cyano radical.

10. The process of claim 9 wherein at least a 1-mole excess of the phosphorus ligand PXYZ is used over that required in the nickel complex $Ni(PXYZ)_4$.

11. The process of claim 10 wherein the promoter is zinc chloride.

12. The process of claim 11 wherein the crystalline zeolite molecular sieve is of the group consisting of Types 3A, 4A, 5A, 10X or 13X.

13. The process of claim 5 wherein the catalyst consists essentially of a zerovalent nickel complex of the group consisting of N-bonded nitrile complexes of the formula $Ni(PXYZ)_3R^2CN$ and olefin-bonded complexes of the formula $Ni(PXYZ)_2A$ wherein X is OR, Y and Z are R or OR and R is of the group consisting of alkyl and aryl radicals of up to 18 carbon atoms, $R^2$ is of the group consisting of 2-butenyl, 3-butenyl and cyano-substituted alkyl radicals and A is of the group consisting of 3-pentenenitrile and 4-pentenenitrile, wherein the R radicals of a given phosphorus ligand PXYZ are so chosen that the ligand has a cone angle of 130° to 170°.

14. The process of claim 13 wherein there is also present as a promoter an organoboron compound of the group consisting of $B(R^3)_3$, and $B(OR^3)_3$, wherein $R^3$ is of the group consisting of aryl radicals of from 6 to 18 carbon atoms, lower alkyl radicals of from 1 to 7 carbon atoms and lower alkyl radicals of from 1 to 7 carbon atoms substituted with a cyano radical.

15. The process of claim 14 wherein the organoboron compound is $B(R^3)_3$ and $R^3$ is an aryl radical.

16. The process of claim 15 wherein at least a 1-mole excess of the phosphorus ligand PXYZ is used over that required in the nickel complexes $Ni(PXYZ)_3R^2CN$ and $Ni(PXYZ)_2A$.

17. The process of claim 16 wherein $B(R^3)_3$ is triphenyl borane.

18. The process of claim 17 wherein the crystalline zeolite molecular sieve is of the group consisting of Types 3A, 4A, 5A, 10X and 13X.

\* \* \* \* \*